(12) United States Patent
Bartolini et al.

(10) Patent No.: US 9,045,813 B2
(45) Date of Patent: Jun. 2, 2015

(54) PROCESS FOR THE SELECTIVE REMOVAL OF MOLYBDENUM FROM A SOLUTION CONTAINING IT

(75) Inventors: Andrea Bartolini, San Giuliano Milanese (IT); Emilio Sentimenti, Carbonera (IT)

(73) Assignee: ENI S.P.A., Rome (IT)

( * ) Notice: Subject to any disclaimer, the term of this patent is extended or adjusted under 35 U.S.C. 154(b) by 63 days.

(21) Appl. No.: 13/885,504

(22) PCT Filed: Nov. 25, 2011

(86) PCT No.: PCT/EP2011/071011
§ 371 (c)(1),
(2), (4) Date: Jul. 9, 2013

(87) PCT Pub. No.: WO2012/069625
PCT Pub. Date: May 31, 2012

(65) Prior Publication Data
US 2014/0286839 A1    Sep. 25, 2014

(30) Foreign Application Priority Data

Nov. 26, 2010   (IT) .............................. MI2010A2200

(51) Int. Cl.
| | |
|---|---|
| *C01F 1/00* | (2006.01) |
| *C22B 34/34* | (2006.01) |
| *C01G 39/00* | (2006.01) |
| *C22B 3/34* | (2006.01) |
| *C22B 3/20* | (2006.01) |
| *C22B 7/00* | (2006.01) |
| *C22B 34/22* | (2006.01) |

(52) U.S. Cl.
CPC .............. *C22B 34/34* (2013.01); *C01G 39/003* (2013.01); *Y10S 210/912* (2013.01); *C22B 3/0031* (2013.01); *C22B 3/20* (2013.01); *C22B 7/007* (2013.01); *C22B 7/009* (2013.01); *C22B 34/225* (2013.01); *C22B 34/345* (2013.01)

(58) Field of Classification Search
None
See application file for complete search history.

(56) References Cited

U.S. PATENT DOCUMENTS

| | | | | |
|---|---|---|---|---|
| 3,458,277 | A | * | 7/1969 | Prater et al. .................. 423/21.1 |
| 3,681,016 | A | * | 8/1972 | Litz ................................ 423/50 |
| 5,320,759 | A | * | 6/1994 | Coltrinari ..................... 210/705 |
| 7,002,044 | B2 | | 2/2006 | Erkey et al. |
| 7,255,795 | B2 | | 8/2007 | Sentimenti et al. |

FOREIGN PATENT DOCUMENTS

CN          1511195 A       7/2004

OTHER PUBLICATIONS

Chinese Office Action dated Feb. 8, 2014.
Sievert, Feb. 6, 1956, 22, 93 China Academic journal Electronic Publishing House.
Database WPI, Week 200801, Thomson Scientific, London, GB; AN 2008-A10415, XP002644613.

* cited by examiner

*Primary Examiner* — Steven Bos
(74) *Attorney, Agent, or Firm* — Tarolli, Sundheim, Covell & Tummino LLP

(57) ABSTRACT

The present invention relates to a process for selectively removing molybdenum from a solution which contains molybdenum, said process comprising the following steps: bringing the solution to an acid pH lower than or equal to 3, preferably lower than or equal to 2, even more preferably lower than or equal to 0.5, by the addition of an inorganic acid; adding at least one organic solvent, preferably toluene or xylene, to the solution and stirring continuously so as to create a water-organic emulsion; adding to the water-organic emulsion at least one alkaline metal xanthate having the general formula MeRX, wherein R is a linear or branched alkyl group having a number of carbon atoms higher than or equal to 2, Me is an alkaline metal selected from Li, Na, K, Rb, Cs and Fr, and X is the xanthate group, so as to form a complex with molybdenum wherein the molar ratio molybdenum/alkaline metal xanthate ranges from 1/6 to 1/2, keeping the emulsion at an acid pH by the addition of an inorganic acid, and interrupting the stirring so as to allow the separation of the aqueous phase from the organic phase. The linear or branched alkyl group R preferably has a number of carbon atoms higher than or equal to 2 and lower than or equal to 12. A reductant is optionally added to the starting solution which comprises Mo and V.

11 Claims, 6 Drawing Sheets

PROCESS FOR THE SELECTIVE REMOVAL OF MOLYBDENUM FROM A SOLUTION CONTAINING IT

RELATED APPLICATION

Figure 1:
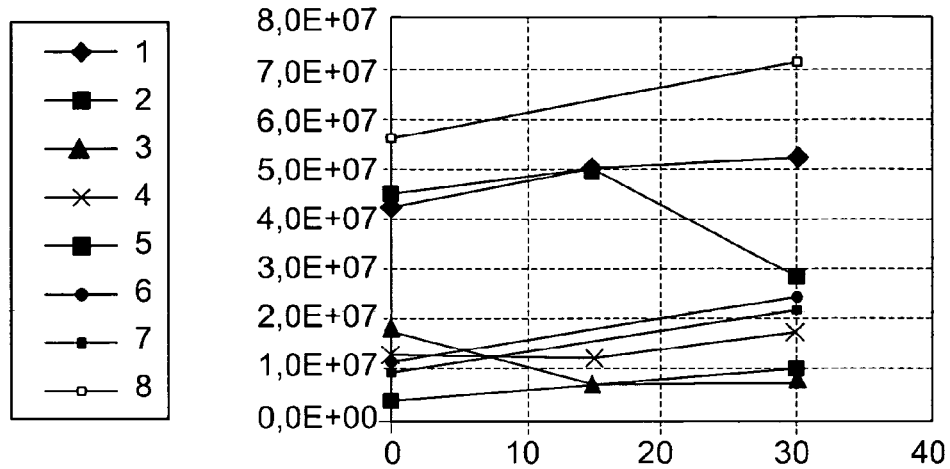

This application is a National Phase filing of PCT/EP2011/071011, filed Nov. 25, 2011, and claims priority to Italian Application No. MI2010A002200, filed Nov. 26, 2010, the subject matter of which are incorporated herein by reference in their entirety.

The present invention relates to a process for the selective removal of molybdenum from a solution containing the metals Molybdenum and Vanadium. In particular, the present invention relates to a process for the selective removal of Mo using a Xanthate of alkaline metals, converting it into molybdenum xanthate, from a solution comprising the metals Molybdenum and Vanadium.

The catalyst used in the hydrotreatment process of heavy residues in slurry phase comprises molybdenum sulphide $MoS_2$. Oil-soluble compounds of molybdenum, such as, for example, molybdenum octoate and molybdenum naphthenate, are precursors of said catalyst. The use of xanthates of alkaline metals is known in literature for the flotation treatment of minerals such as molybdenite. The extractors of minerals are organic substances used for the selective recovery of metal sulphides from mixtures of minerals. The extractive capacity of xanthates increases with an increase in the carbon atom chain, with an increase in the chain, however, the selectivity decreases. Xanthates have a heteropolar molecular structure with a non-polar hydrocarbon group and a polar sulphide group. An interaction takes place between the sulphides of minerals and the polar group of the xanthate, so as to form a water-repellent film on the surface of the mineral, thus allowing the particles of the mineral to be carried to the surface by means of air bubbles. Sodium ethyl xanthate, sodium isobutyl xanthate, sodium isopropyl xanthate and potassium amyl xanthate are among the known xanthates used in the mining field. Sodium isobutyl xanthate is a great extractor of the sulphides of copper, lead, zinc, nickel and noble metals present as sulphides in minerals. Potassium ethyl xanthate is the most selective extractor, but the weakest amongst all the xanthates used for the extraction of metal sulphides and mineral complexes. Sodium isopropyl xanthate has an extractive power slightly higher than sodium ethyl xanthate; it is mainly used as a flotation agent of non-ferrous metal sulphides and as precipitating agent in metallurgical processes. Potassium amyl xanthate is the most powerful extractor of minerals, in particular for copper and nickel sulphides and gold associated with pyrite; it is also widely used as a flotation agent.

A process is known from patent application WO 02/097144, for the selective removal of molybdenum from a liquid mixture comprising molybdenum (in a quantity higher than 200 mg/l) and vanadium. This process envisages that the liquid mixture comprising Mo and V be brought to acid pH; a solution must be subsequently added containing at least one xanthate of alkaline metals in certain proportions, preferably ethyl xanthate or potassium ethyl xanthate, maintaining the pH constant by the addition of an organic acid; the mixture thus prepared is then stirred, inducing the precipitation of molybdenum xanthate. The process described in WO 02/097144 has various critical aspects described hereunder. In general, the xanthates of alkaline metals (alkaline salts) decompose in the presence of water. Analogously, the molybdenum salts of alkaline xanthates rapidly decompose in water with the formation of gas bubbles ($CS_2$, COS and $CO_2$) and disgregation of the original sticky honey-like structure. An expert in the field must minimize decomposition processes of molybdenum xanthates, for example, when they are in storage. The water must be removed in order to reduce the decomposition of the molybdenum xanthates. A further criticality of Mo xanthates is the difficulty in their handling and processability as they are sticky, form foams (moderately) on their surfaces and are instable.

The above criticalities must be overcome for an easier use of molybdenum xanthates as catalyst precursors in catalytic hydrotreating processes in slurry phase. The Applicant has therefore developed an innovative technical solution, by making various modifications to the process described in patent application WO 02/097144 so as to obtain a organic composition concentrated in the molybdenum metal, which is stable and ready to be used directly in catalytic hydrotreatment process in slurry phase. In particular, the Applicant has verified that by adding at least one organic solvent to the solution containing Mo and V, an oil-water emulsion is formed; at least one xanthate of alkaline metals (alkaline salt) is subsequently mixed with this emulsion so as to form the molybdenum xanthate complex. In this way, the molybdenum xanthate remains in solution in the organic phase, which is stable and can be easily separated from the aqueous phase. In the organic phase, in fact, xanthates show a stability suitable for industrial use, furthermore, they can be used directly as precursors of the catalyst used in the reactors of catalytic hydrotreatment processes in slurry phase.

In the light of what is specified above, an objective of the present invention is to selectively separate the molybdenum metal mainly from vanadium by means of at least one xanthate of an alkaline metal, converting it into molybdenum xanthate, which is a precursor of the catalyst used in catalytic hydrotreatment processes in slurry phase.

In one of its embodiments, the present invention relates to a process for the selective removal of molybdenum from a solution containing molybdenum, said process comprising the following steps:
- bringing the solution to an acid pH lower than or equal to 3, by the addition of an inorganic acid;
- adding at least one organic solvent to the solution and stirring continuously so as to create a water-organic emulsion;
- adding to the water-organic emulsion at least one alkaline metal xanthate having general formula MeRX, wherein R is a linear or branched alkyl group having a number of carbon atoms higher than or equal to 2, Me is an alkaline metal selected from Li, Na, K, Rb, Cs and Fr, and X is the xanthate group, so as to form a complex with molybdenum wherein the molar ratio molybdenum/alkaline metal xanthate ranges from 1/6 to 1/2, keeping the emulsion at an acid pH by the addition of an inorganic acid, and interrupting the stirring so as to allow the separation of the aqueous phase from the organic phase.

The main advantage offered by the process, object of the present invention, is to easily separate molybdenum from vanadium, obtaining a stable form of molybdenum xanthate suitable, as such, for use as catalyst precursor. The molybdenum xanthate, as it remains in the organic phase, is no longer in contact with water and consequently does not decompose, or it decomposes much more slowly. Furthermore, this emulsion is easier to handle and process as the dissolution in an organic solvent makes it less sticky, reducing adhesion to the surfaces. Finally, once the organic phase has been separated, this is ready to be used as such in catalytic hydrotreatment reactors in slurry phase, as it is a catalyst precursor.

Further objectives and advantages of the present invention will appear more evident from the following description and enclosed drawings, provided for purely illustrative and non-limiting purposes.

FIG. 1 represents the trend of the emissions of $CS_2$ due to the decomposition of the compound molybdenum amyl xanthate during its storage. The axis X represents the time in days and the axis Y the abundance. The following symbols are applied:
1. Compound as such at room temperature
2. Compound as such at 50° C.
3. Compound as such and addition of gas oil at room temperature
4. Compound as such and addition of gas oil at a temperature of 50° C.
5. Compound as such and addition of xylene at room temperature
6. Compound as such and addition of xylene at a temperature of 50° C.
7. Compound as such and addition of cyclohexane at room temperature
8. Compound as such and addition of cyclohexane at a temperature of 50° C.

Figure 2:
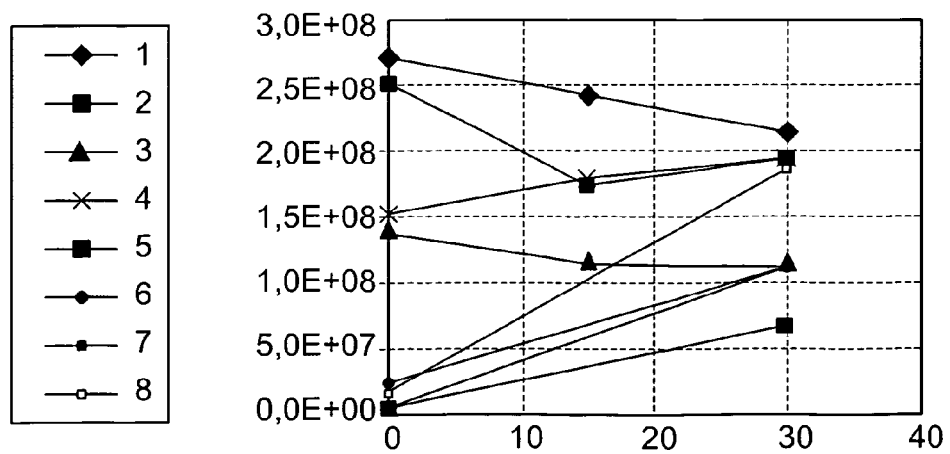

FIG. 2 represents the trend of the emissions of COS due to the decomposition of the compound molybdenum amyl xanthate during its storage. The axis X represents the time in days and the axis Y the abundance. Apply the symbols as in FIG. 1.

Figure 3:
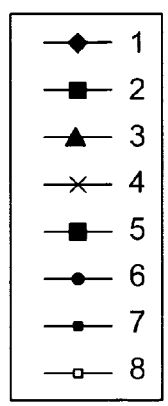
Figure 3:
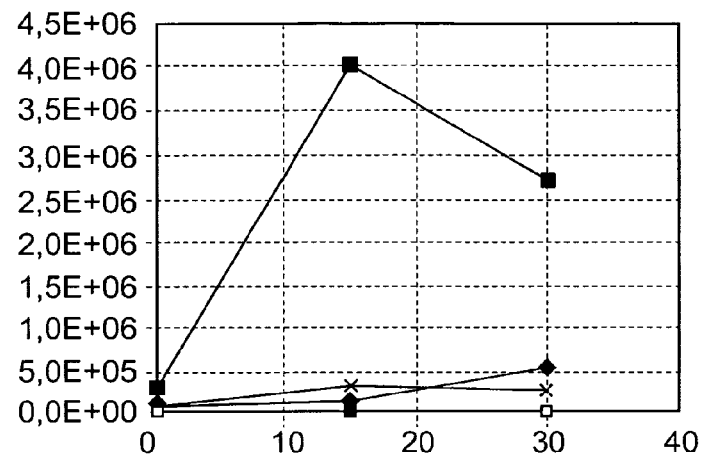

FIG. 3 represents the trend of the emission of dimethyl sulphide due to the decomposition of the compound molybdenum amyl xanthate during its storage. The axis X represents the time in days and the axis Y the abundance. Apply the symbols as in FIG. 1.

Figure 4:
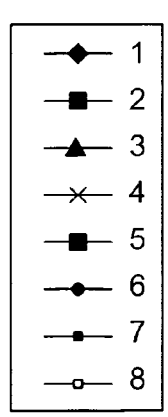
Figure 4:
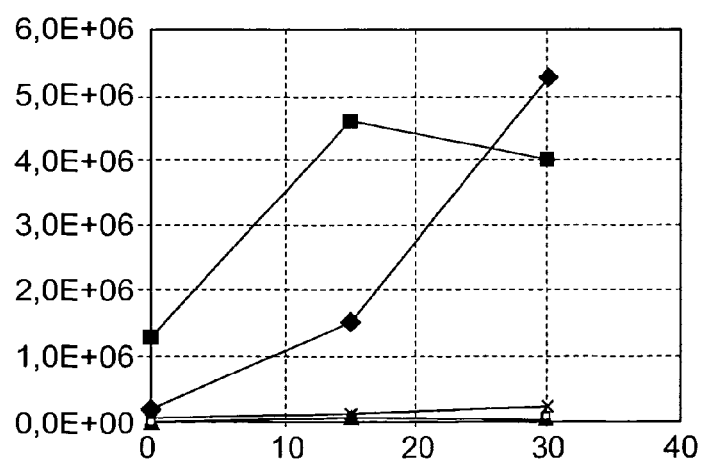

FIG. 4 represents the trend of the emissions of ethyl isopentyl disulfide due to the decomposition of the compound molybdenum amyl xanthate during its storage. The axis X represents the time in days and the axis Y the abundance. Apply the symbols as in FIG. 1.

Figure 5:
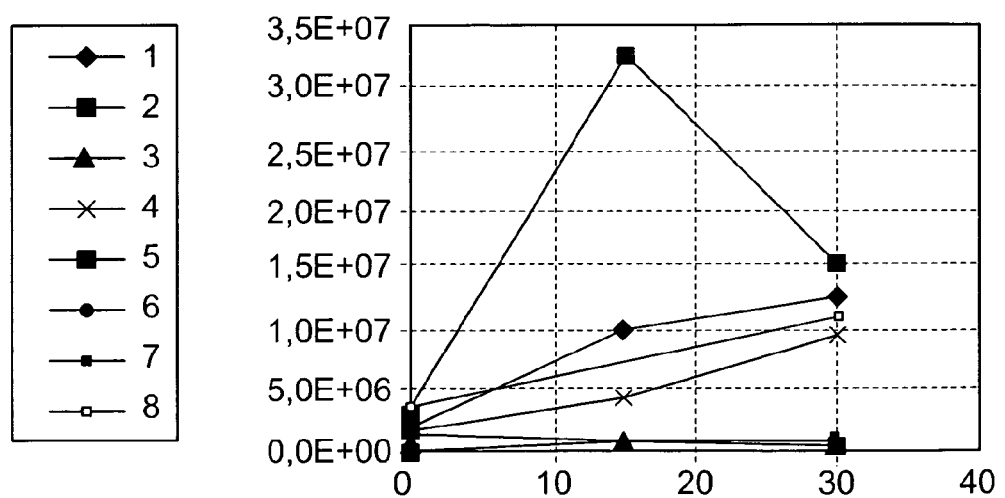

FIG. 5 represents the trend of the emissions of 3-methyl-1-butanol due to the decomposition of the compound molybdenum amyl xanthate during its storage. The axis X represents the time in days and the axis Y the abundance. Apply the symbols as in FIG. 1.

Figure 6:
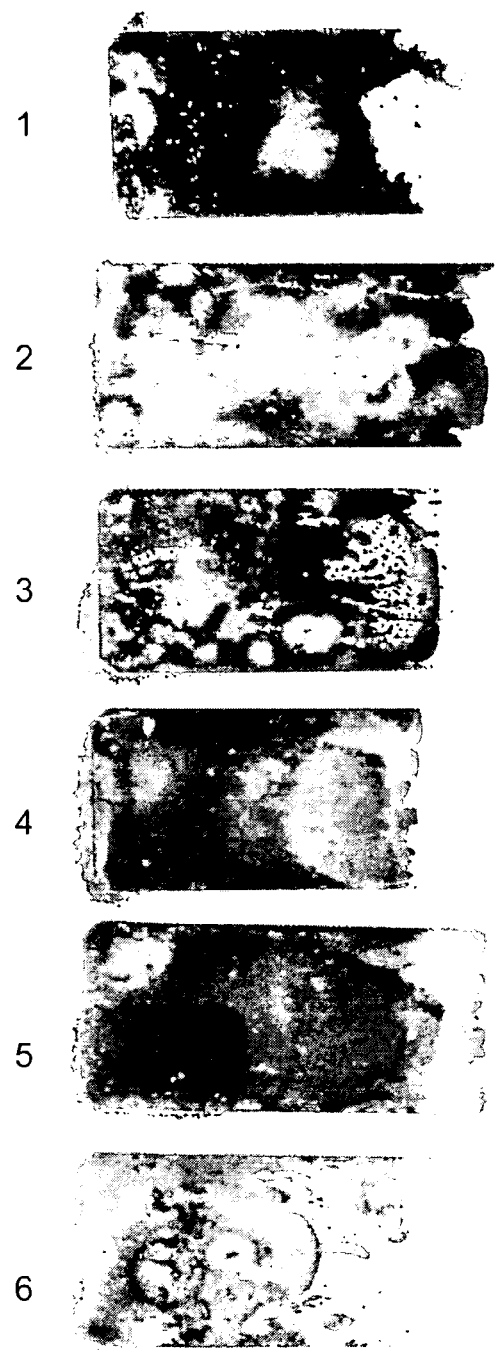

FIG. 6 illustrates the slides after immersion of molybdenum amyl xanthate in the different organic phases.

Figure 7:
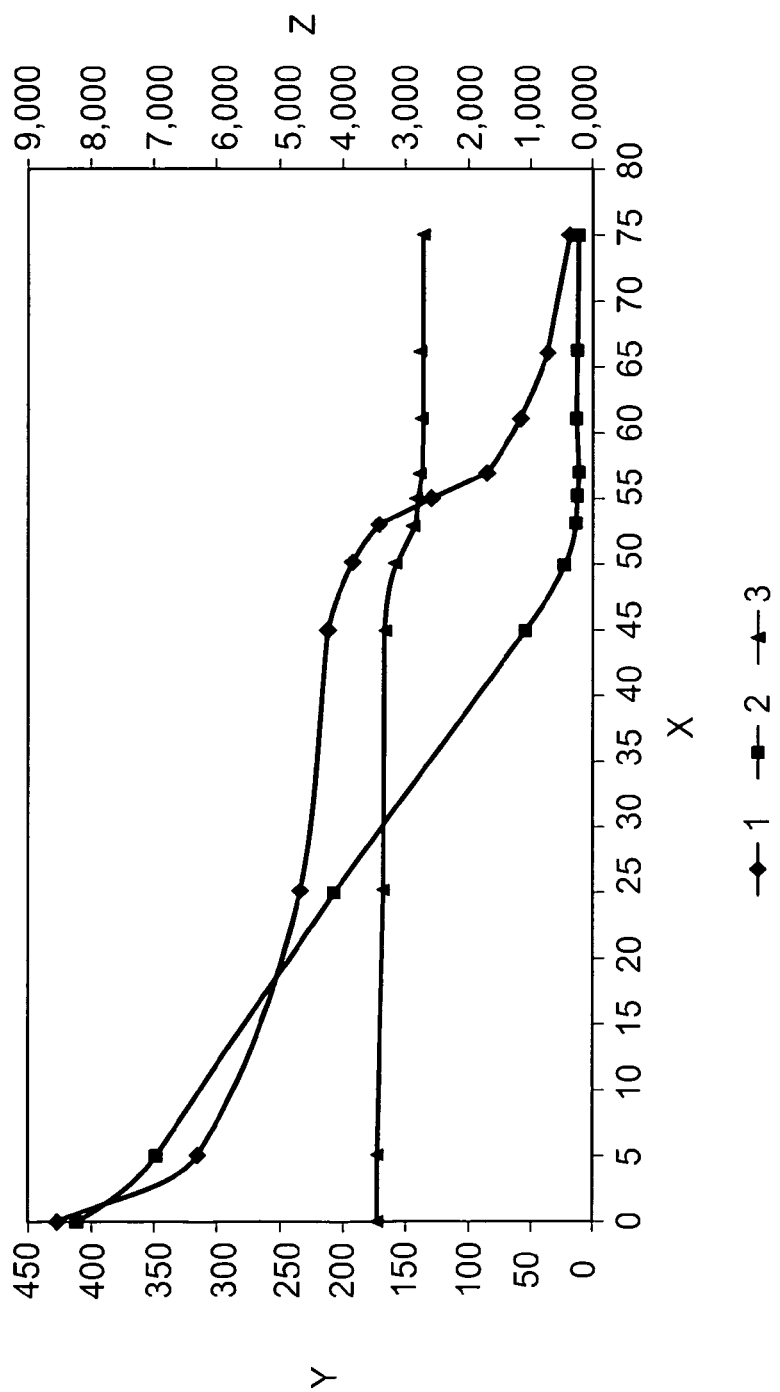

FIG. 7 shows the trend of the concentration of molybdenum and vanadium and the red-ox potential in my of the solution with the addition of potassium amyl xanthate at 30% w/v. The axis X represents the ml of solution of potassium amyl xanthate at 30% w/v and the axis Y the red-ox potential in mv. The following symbols are applied:
Z is the concentration in g/l
1 are the my
2 are the g/l of Mo
3 are the g/l of V.

Figure 8:
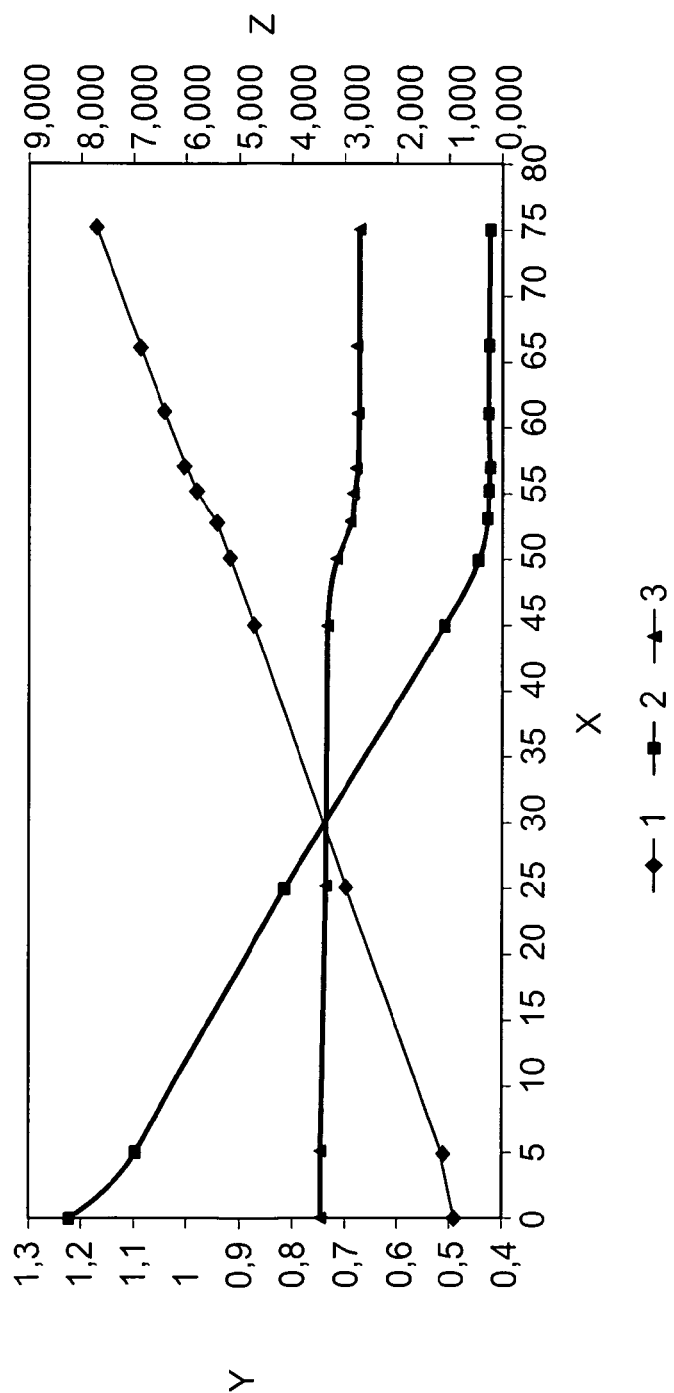

FIG. 8 shows the trend of the pH during the precipitation of molybdenum amyl xanthate in aqueous solution. The axis X represents the ml of solution of potassium amyl xanthate at 30% w/v and the axis Y the pH. The following symbols are applied:
Z is the concentration in g/l
1 is the pH
2 are the g/l of Mo
3 are the g/l of V.

DETAILED DESCRIPTION

An embodiment of the present invention is a process for the selective removal of molybdenum from a solution comprising molybdenum. Molybdenum is one of the most valuable components of the catalysts used in catalytic hydrotreatment processes in slurry phase. Its recovery is consequently important as it reduces the make-up cost of fresh catalyst. The initial solution comprises soluble species of molybdenum and vanadium. During the process, object of the present invention, a reductant, preferably $Na_2SO_3$, is possibly added to the initial solution, in order to prevent the formation of red sludge. In a first phase, an inorganic acid is added to said solution until a pH lower than or equal to 3 is reached, preferably lower than or equal to 2, even more preferably lower than or equal to 0.5. Once the solution is acidified, at least one organic solvent is added and the solution formed is maintained under stirring so as to create a water-organic emulsion. The organic solvent is preferably xylene or toluene. The novelty of the present invention is specifically the formation of a water-organic emulsion by the addition of at least one organic solvent to the acid composition. Only after this emulsion has been formed, is at least one xanthate of alkaline metals added, indicated by the formula MeRX wherein R is a linear or branched alkyl group having a number of carbon atoms higher than or equal to 2, Me is an alkaline metal selected from Li, Na, K, Rb, Cs and Fr, and X is the xanthate group. The alkaline metal is preferably Na or K. The mixture obtained must have a molar ratio of molybdenum/alkaline metal xanthate ranging from 1/6 to 1/2, preferably from 1/4 to 1/3 and must form a complex with molybdenum, indicated by the formula MoRX wherein Mo is molybdenum. The complex with molybdenum remains in the organic phase, thus reducing the contact with water and the consequent decomposition and release of $CS_2$.

In this phase said emulsion is maintained at an acid pH by the addition of an inorganic acid. Finally, the stirring is interrupted in order to allow the separation of the aqueous phase from the organic phase which contains the molybdenum xanthate complex (MoRX) and which is ready to be used directly in the catalytic hydrotreatment reactors in slurry phase.

The solubility of the molybdenum xanthates having formula MoRX in the organic solvents can increase with the length of the linear or branched alkyl group R, said group R deriving from the xanthate of the alkaline metal having formula MeRX.

As specified above, the xanthates of alkaline metals (MeRX) used in the process, object of the present invention, are those in which the linear or branched alkyl group R has a number of carbon atoms higher than or equal to 2, more preferably higher than or equal to 2 and lower than or equal to 12. The alkaline metal is preferably Na or K. Furthermore, the linear or branched alkyl group R is preferably selected from ethyl, isopropyl, isobutyl, amyl, n-hexyl, n-octyl, n-decyl and n-dodecyl. Even more preferably, the xanthates of the alkaline metals are selected from Potassium Ethyl Xanthate, Sodium Isopropyl Xanthate Sodium Isobutyl Xanthate, Potassium Amyl Xanthate, Potassium Hexyl Xanthate, Potassium Octyl Xanthate, Potassium Decyl Xanthate and Potassium Dodecyl Xanthate.

In order to evaluate the solubility of the compounds MoRX, the Applicant used a technique which consists in dissolving the xanthate MoRX in a quantity of solvent lower than the maximum solubility. The organic extract was then analyzed in order to determine the content of Mo. The Applicant tested the compounds Sodium Isobutyl Xanthate (Me=Na and R=IB), Sodium Isopropyl Xanthate (Me=Na and R=IP), Potassium Amyl Xanthate (Me=K and R=A) and Potassium Ethyl Xanthate (Me=K and R=E). The solubility data of the MoRX compounds tested in organic solvent are indicated in table 1

TABLE 1

| Compound | Mo/RX (mol/mol) | Solubility fresh MoRX (% Mo) | Aspect of the precipitate |
|---|---|---|---|
| MoEX | 1/3 | Toluene 2.9<br>Gas oil <0.3<br>Gasoline 0.5 | Plastic,<br>Medium viscosity<br>Solidifies in 12 h-24 h |
| MoIBX | 1/3 | Toluene 5.9<br>Gas oil <0.2<br>Gasoline 0.8 | Plastic,<br>Medium viscosity<br>Solidifies in 24 h-48 h |
| MoIPX | 1/3 | Toluene 0.8<br>Gas oil <0.2<br>Gasoline <0.2 | Plastic,<br>High viscosity<br>Solidifies in 24 h-48 h |
| MoAX | 1/3 | Toluene 5.8<br>Gas oil 0.2<br>Gasoline 2.7<br>LCO 1.1<br>Xylenes 7.5 | Plastic,<br>Medium viscosity<br>Does not solidify<br>within 20 days |

Table 1 shows an increasing solubility with an increase in the length of the alkyl chain R in both the linear and branched group.

Molybdenum iso-butyl xanthate and Molybdenum amyl xanthate advantageously show a good solubility in toluene. Molybdenum amyl xanthate, even more advantageously, has a very high solubility in xylenes. Table 1 also shows that the compound MoAX advantageously tends to solidify much more slowly than the other xanthates indicated in Table 1, thus allowing a greater stability for longer storage times. The xanthates of alkaline metals and their complex compounds, including the complexes between xanthates and molybdenum (MoRX), in the presence of water, decompose, releasing $CS_2$, $CO_2$ and COS. In general, therefore, one of the objectives of the present invention is to increase the stability of the compounds MoRX, especially in all cases in which storage for prolonged periods is required. The stability of the compounds MoRX can vary with a variation in the length of the alkyl chain R, in particular, homologous products with a longer chain can decompose more slowly.

The stability of the complex compounds MoRX was analyzed by dissolving said compounds in toluene, their insoluble residue was then left to rest in the air for several weeks. The insoluble residues of MoRX in toluene were then compared and the result is shown in Table 2.

TABLE 2

| Type of Xanthate | Mo (%) | Insoluble residue in Toluene (%) |
|---|---|---|
| MoEX | 18 | 1 week: 7.0<br>4 weeks: 40.6 |
| MoIBX | 15.5 | 1 week: 4.0<br>4 weeks: 14.1 |
| MoIPX | 18.2 | 1 week: 23.7<br>4 weeks: 52.3 |
| MoAX | 15 | 1 week: 2.4<br>4 weeks: 4.9 |

It can be deduced from Table 2 that among the linear and also branched compounds, the stability increases with an increase in the number of carbon atoms of the alkyl group. The Applicant consequently assumes that the higher the number of carbon atoms of the alkyl group, the more stable the compound will be, and consequently all xanthates of alkaline metals in which the number of carbon atoms varies from 2 to 12, are preferred. Furthermore, molybdenum isobutyl xanthate (MoIBX) shows a good stability and resistance to degradation in air and by hydrolysis with the residual aqueous solution.

Molybdenum amyl xanthate (MoAX) surprisingly proved to be the most stable and less subject to degradation in air and by hydrolysis with the residual aqueous solution. The Applicant consequently analyzed more in detail the stability of the compound molybdenum amyl xanthate, which spontaneously degrades in relation to the different storage conditions (temperature, times, additives) and mainly forms the volatile products $CS_2$, COS, dimethyl sulphide, ethyl isopentyl disulphide and 3-methyl-1-butanol. The analysis of the stability of MoAX is described in Example 1, whereas the application of the process, object of the present invention, is described in Example 2.

Example 1

Stability of Molybdenum Amyl Xanthate (MoAX) During Storage

The present example describes an operative method for identifying the possible emission of volatile compounds due to the decomposition of the product molybdenum amyl xanthate. MoAX was obtained from Mo alone starting from potassium amyl xanthate (KAX) with a molar ratio Mo/KAX of 1/3 and separated by filtration. Portions of 0.3 g of MoAX were sealed in vials and maintained at room temperature (20° C.) and at 50° C. for different times. The tests effected under a head of gas oil, cyclohexane and with solubilization of xylene, were aimed at verifying the possible absorption of volatile products, thus limiting their emission. The overlying gas phase was analyzed by means of the GC-MS technique. The main degradation products are $CS_2$, COS, Dimethyl sulphide, Ethyl isopentyl disulphide and 3-methyl-1-butanol. FIGS. 1, 2, 3, 4 and 5 show the trends of the emissions of these substances, in relation to the time and storage conditions (temperature and head). According to FIG. 1, the emission of $CS_2$ does not seem to increase much with an increase in the storage time and temperature. The gas oil head and solubilization in xylene suppress the emission, even at the temperature of 50° C., whereas cyclohexane seems to be efficient only at room temperature.

According to FIG. 2, the concentration of COS in the vapour increases with time and, to a lesser extent, in relation to the temperature. Also in this case, the effect of the presence of a head of gas oil, cyclohexane and solubilization in xylene, is confirmed. According to FIG. 3, dimethyl sulphide develops substantially only at 50° C., whereas under all the other conditions its release is greatly reduced.

The influence of the time parameter also seems to be limited. From FIG. 4 it can be seen that ethyl isopentyl disulphide only develops from the sample MoAX as such and greatly depends on the storage duration. In the remaining cases, the formation is greatly reduced, also for long times and high temperatures. As can be seen in FIG. 5, the effect of the head of gas oil, cyclohexane and xylene is also significant for 3-methyl-1-butanol, even at 50° C. and for prolonged storage times.

Example 2

Precipitation of Molybdenum Amyl Xanthate in Emulsion with Xylene

The present example describes the precipitation of molybdenum amyl xanthate (MoAX) in emulsion with xylene in order to verify the maximum concentration of molybdenum in organic phase compatible with a reasonable handling in terms of adhesion of the precipitate to the walls of the reactor.

215 ml of an aqueous solution at a pH of 0.5, coming from a stream containing 9 g/l of molybdenum and 3.5 g/l of vanadium, 3.2 gr. of $Na_2SO_3$ and 35 ml of $H_2SO_4$ 1/1, were used. Xylene was added repeatedly to the solution, the solution was then put under vigorous stirring at 1,300 rpm with a Silverson mixer. 84.5 ml of a solution of potassium amyl xanthate at 300 g/l were added to the water-organic emulsion, under constant stirring. After about 1 minute from the interruption of the mixing, the phases separated. By immersing a slide in the organic phase, it was possible to visibly verify the adhesion degree and therefore the fouling caused by MoAX on the surface of the slide. The sequence was repeated with subsequent additions of xylene in order to vary the aqueous phase/organic phase A/O ratio according to the scheme shown in Table 3. As can be seen from the data indicated in Table 3, assuming the complete extraction of Mo from the aqueous phase, the first test was carried out with a supersaturated xylene solution of molybdenum, as the solubility of MoAX expressed as Mo is 7.5%.

TABLE 3

| Position | A/O net of KAX | Mo in O (%) |
|---|---|---|
| 1 | 12.3 | 9.3 |
| 2 | 8.1 | 6.1 |
| 3 | 6.4 | 4.8 |
| 4 | 5.3 | 4 |
| 5 | 3.9 | 2.9 |
| 6 | 2.1 | 1.6 |

FIG. 6 shows the slides after immersion in the different organic phases. An improvement in the flow or reduction in fouling can be observed already starting from slides 3-4 corresponding to an A/O ratio of between 6 and 5. With these ratios, xylene solutions are obtained with calculated concentrations of Mo ranging from 4.8% to 4%.

Example 3

Synthesis of MoIBX—Molybdenum Isobutyl Xanthate 200 ml of a solution containing 6 g of $MoO_3$ in a strongly basic environment due to NaOH, were brought to a pH of 0.5 with diluted $H_2SO_4$ 1/1. 72.3 ml of a solution of sodium isobutyl xanthate at a concentration of 300 g/l (molar ratio Mo/NaIBX 1/3) were added dropwise, under stirring, to the solution. The aqueous solution at the end of the precipitation is light pink-coloured and tends to become milky. The final pH of the solution is 1.4. The precipitate has a plastic consistency (similar to bitumen).

Example 4

Synthesis of MoIPX—Molybdenum Isopropyl Xanthate 200 ml of a solution containing 3 g of $MoO_3$ in a strongly basic environment are brought to pH 0.5 with diluted $H_2SO_4$ 1/1. 33 ml of a solution of sodium isopropyl xanthate, at a concentration of 300 g/l (molar ratio Mo/NaIPX 1/3) are added dropwise, under stirring, to the solution. The solution, at the end of the precipitation is almost colourless (slightly pink) and tends to cloud with time. The precipitate has a bituminous consistency and a high viscosity and tends to adhere to the reaction vessel and to the stirrer. Within 2-3 hrs the precipitate mass, although maintaining a plastic consistency, becomes less adhesive.

Example 5

Synthesis of MoAX—Molybdenum Amyl Xanthate 200 ml of a basic solution, due to NaOH, of $MoO_3$ containing 1% of Mo are brought to pH 0.5 with diluted $H_2SO_4$ 1/1.

42.1 ml of a solution of KAX at a concentration of 300 g/l (molar ratio Mo/KAX 1/3) are added to the solution.

Also in this case, at the end of the precipitation the solution is almost colourless. The precipitate shows a viscous consistency (honey-like) which, in the presence of the aqueous phase, practically shows no adhesion to the surrounding environment and settles on the bottom of the reaction vessel.

Upon removing the aqueous phase, the precipitate shows marked characteristics of adhesion to the surfaces, said characteristics disappearing again if re-introduced into water.

Example 6

MoAX Precipitation in Aqueous Solution

The present example describes the precipitation of molybdenum amyl xanthate MoAX in 200 ml of an aqueous solution containing 9 g/l of Mo and 3.5 g/l of V. 3.5 g of $Na_2SO_3$ are added to the solution. The pH of the solution is brought to 0.5 by adding 26 ml of $H_2SO_4$ 1/1. The precipitation of MoAX is effected using an aqueous solution of potassium amyl xanthate at a concentration of 300 g/l. During the titration, the pH and potential of the solution were measured contemporaneously. FIG. 7 shows the trend of the concentration of Mo, V and the potential of the solution as the addition of the precipitant proceeds. It can be observed that already after the addition of 53 ml of KAX (300 g/l solution) the precipitation yield of Mo is higher than 95%, whereas almost 90% of the V remains in solution. Also in this case, the precipitation yield of Mo and the selectivity with respect to V are good. The curve representing the trend of the potential, shows a flex in correspondence with the equivalent point and the precipitation takes place within the potential range of 200 mV to 150 mV. FIG. 8 shows the trend of the pH during the reaction, which increases from the initial value of 0.5 to about 1 at the end of the precipitation.

The invention claimed is:

1. A process for selectively removing molybdenum from an aqueous solution which comprises molybdenum, said process comprising the following steps:
   bringing the solution to an acid pH less than or equal to 3 by addition of an inorganic acid;
   adding at least one organic solvent to the solution and stirring continuously to create a water-organic emulsion;
   adding at least one alkaline metal xanthate of general formula MeRX, wherein R is a linear or branched alkyl group having a carbon atom number greater than or equal to 2, Me is an alkaline metal selected from the group consisting of Li, Na, K, Rb, Cs and Fr, and X is the xanthate group, to the water-organic emulsion, to form a complex with molybdenum wherein the molar ratio molybdenum/alkaline metal xanthate ranges from 1/6 to 1/2, keeping the emulsion at an acid pH by addition of an inorganic acid, and interrupting the stirring to allow the separation of the aqueous phase from the organic phase.

2. The process according to claim 1 wherein the molar ratio molybdenum/alkaline metal xanthate ranges from 1/4 to 1/3.

3. The process according to claim 1 wherein the alkaline metal Me is K or Na.

4. The process according to claim 1 wherein the linear or branched alkyl group R has a carbon atom number greater than or equal to 2 and less than or equal to 12.

5. The process according to claim 4 wherein the linear or branched alkyl group R is chosen from Ethyl, Isopropyl, Isobutyl, Amyl, n-hexyl, n-octyl, n-decyl, or n-dodecyl.

6. The process according to claim 1 wherein the alkaline metal xanthates of general formula MeRX are selected from the group consisting of Potassium Ethyl Xanthate, Sodium Isopropyl Xanthate, Sodium Iso Butyl Xanthate, Potassium Amyl Xanthate, Potassium hexyl Xanthate, Potassium Octyl Xanthate, Potassium Decyl Xanthate and Potassium Dodecyl Xanthate.

7. The process according to claim 1 wherein the solution is brought to a pH less than or equal to 2 by addition of an inorganic acid.

8. The process according to claim 7 wherein the solution is brought to a pH less than or equal to 0.5 by addition of an inorganic acid.

9. The process according to claim 1 wherein the organic solvent is toluene or xylene.

10. The process according to claim 1, wherein a reductant is added to the solution comprising Mo.

11. The process according to claim 10 wherein the reductant is Sodium Sulphite.

* * * * *